March 12, 1963     B. BARÉNYI     3,080,807
VENTILATING SYSTEM FOR AUTOMOBILES
Filed Dec. 17, 1959     2 Sheets-Sheet 1

INVENTOR.
BÉLA BARÉNYI
BY
ATTORNEYS

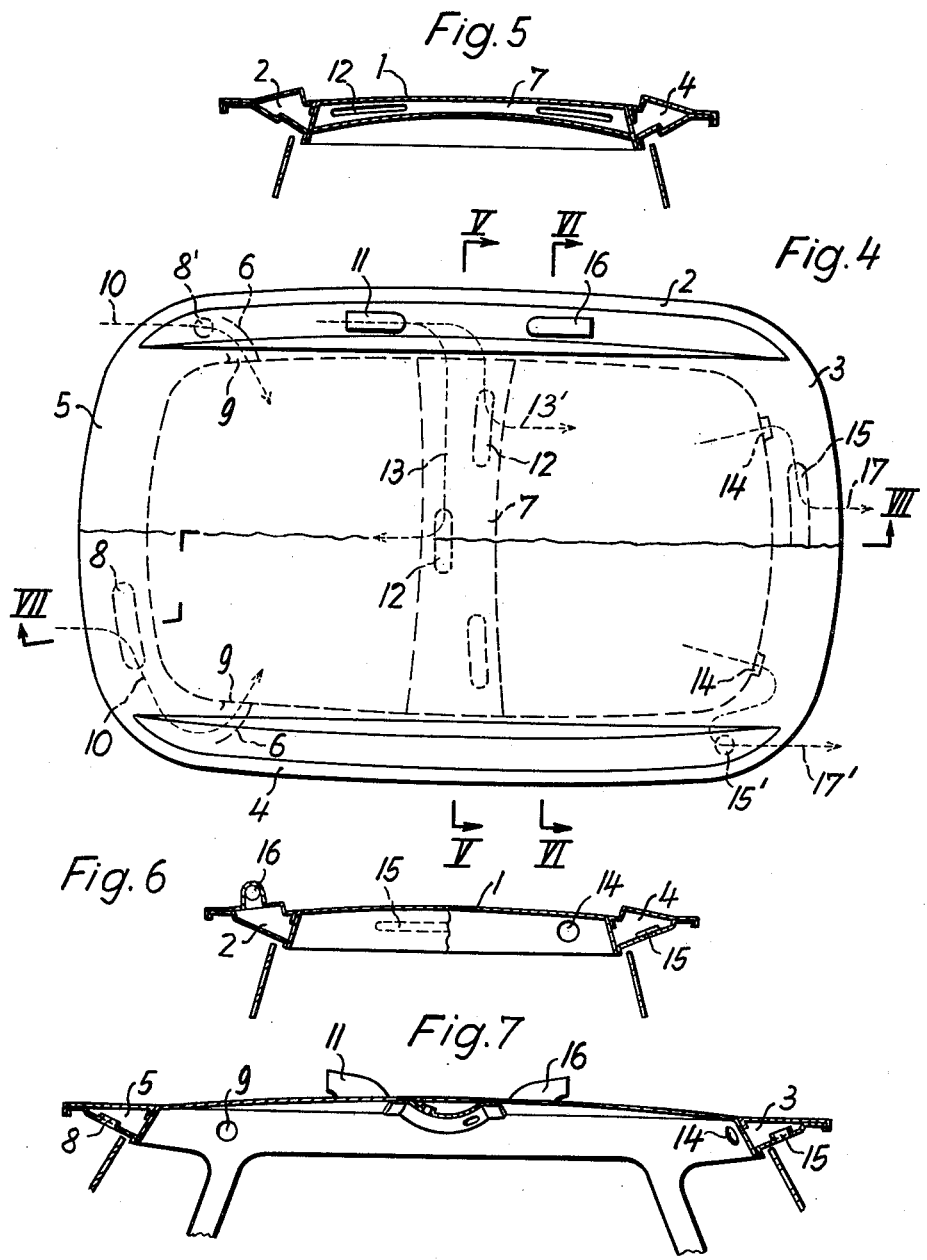

United States Patent Office 3,080,807
Patented Mar. 12, 1963

3,080,807
VENTILATING SYSTEM FOR AUTOMOBILES
Béla Barényi, Stuttgart-Vaihingen, Germany, assignor to Daimler-Benz Aktiengesellschaft, Stuttgart-Unterturkheim, Germany
Filed Dec. 17, 1959, Ser. No. 860,240
Claims priority, application Germany Dec. 20, 1958
6 Claims. (Cl. 98—2)

The present invention relates to the body structure of an automobile and to a novel ventilating system for ventilating the inside of this automobile.

It is an object of the present invention to provide a novel and very effective means for ventilating the inside of an automobile, and to arrange these means in a manner and position so as to require very little space and to be hardly noticeable from the outside or inside of the automobile.

It is a further object of the invention to provide an automobile body with a top which projects over the closed car doors, and in which the top itself as well as particularly the projecting rim portions thereof are utilized for installing at least some of the components of the new ventilating system.

Further objects of the invention consists in providing an at least partly hollow top structure for an automobile, including hollow laterally projecting rim portions thereon, in utilizing these hollow portions as ventilating channels, and in providing a plurality of ventilating openings in the walls of these channels, as well as suitable means, such as valves or baffles, etc., in and on these hollow top portions and the ventilating channels therein and at various points thereof to permit the ventilation of the interior of the automobile to be extensively varied and controlled and the inside temperature to be regulated through such inside ventilation as well as through the ventilation of the car top and the projecting parts thereof.

Another object of the invention is to provide the top of an automobile which is equipped with hollow outwardly projecting rim portions with a hollow crossbeam at the lower side thereof, and in utilizing this hollow crossbeam in combination with the hollow rim portions of the car top to form a system of ventilating channels which, controlled by suitable valves and the like, permit various parts of the inside of the automobile to be ventilated more extensively than others so that each occupant of the automobile can choose the degree of ventilation most desirable to him.

Still another object of the invention is to provide a control mechanism to permit all of the air inlet openings to be controlled from a single point and preferably by a single control element.

These and other objects, features, and advantages of the present invention will also appear from the following detailed description thereof, particularly when the same is read with reference to the accompanying drawings, in which—

FIGURES 1, 2, and 3 show diagrammatic front, side, and top views of an automobile according to the present invention;

FIGURE 4 shows at the upper and lower sides plan views of two different embodiments of the top structure according to the invention;

FIGURES 5 and 6 show cross sections taken along lines V—V and VI—VI, respectively, of FIGURE 4; while FIGURE 7 shows a cross section taken along line VII—VII of FIGURE 4.

Figure 1:
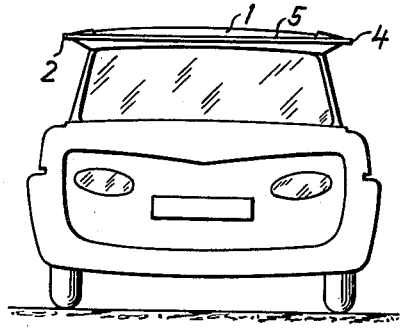
Figure 2:
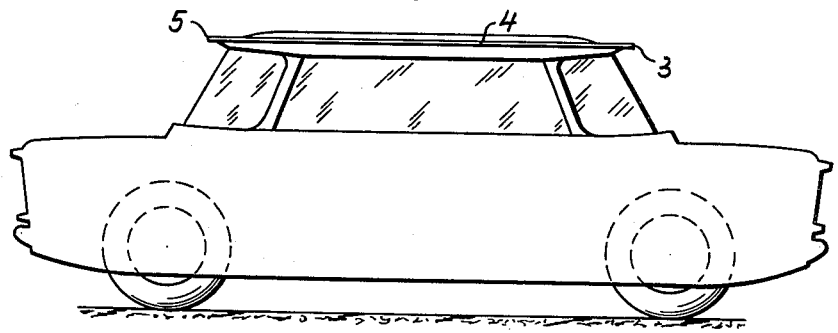
Figure 3:
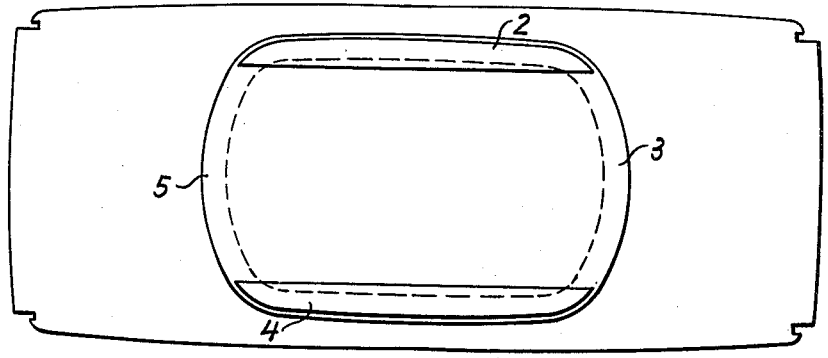

Referring to the drawings, FIGURES 1, 2, and 3 are merely given to illustrate the general outline of an automobile, particularly a passenger car, to which the invention is particularly applicable. This car has a substantially flat top 1 with outwardly extending rim portions 2, 3, 4, and 5 which project over the front, side, and rear walls of the car. According to the present invention, at least a part of the car top 1, and particularly these rim portions 2 to 5 are hollow and utilized for ventilating the inside of the car and also for cooling the car top.

As illustrated in FIGURES 4 to 7, the projecting rim portions 2 to 5 may form a continuous ventilating channel or this channel may be divided to form several ventilating channels by the insertion of suitable partitions, baffles or the like, as indicated, for example, at 6 in FIGURE 4. Some of these channels may serve as air inlet channels, while other channels may serve as outlet or venting channels. The car top 1 has a hollow, substantially central crossbeam 7 with open ends which likewise forms at least one ventilating channel which communicates with the channel or channels in rim portions 2 to 5.

For drawing or receiving the air from the outside, particularly when the car is moving, for passing it to the inside of the car, and for venting the inside, some or all of these ventilating channels may be provided with air inlets and outlets at any desired points. Thus, for example, the projecting rim portions 2, 4, or 5 may be provided with air inlets 8 and 8', preferably at the lower side and facing in the driving direction, each of which communicates with at least one outlet opening 9 toward the inside of the car and thus passes the air in the direction of arrows 10 from the outside to the inside of the car.

Air inlet scoops 11, one of which is illustrated in the upper half of FIGURE 4, at the left side of FIGURE 6, and in FIGURE 7, may also be mounted on the upper side of the car top and particularly on the lateral rim portions 2 and 4. These scoops 11 may, for example, communicate through the rim portions with the channel in crossbeam 7, which is provided with outlet openings 12 toward the inside of the car. The air may thus be passed in the direction as shown by arrows 13 and 13'.

Similarly, air outlets 14 may lead the air from the inside of the car into the venting channels within the rim portions and thence through outlets 15 and 15' toward the outside in the direction as shown, for example, by arrows 17 and 17', respectively. The air may also be led from the inside of the car through the venting hoods 16, one of which is illustrated in FIGURES 4 and 7.

As indicated in FIGURES 4 to 7, the air inlets and outlets may be of various shapes, for example, round or elongated. Also, scoops 11 and venting hoods 16 may be of any desired shape, and instead of forming rigid projecting members, they may also be in the form of flaps which may be projected toward the outside to different opening positions as desired and retracted when not used so as to be flush with the outer surface of the car top so that no air can enter or leave through them.

Similarly, any or all of the air inlets and outlets may be provided with suitable means such as valves, etc.

which may be operated from the inside of the car, either individually or in groups, for regulating the flow therethrough. These air regulating means or different groups thereof, may also be controlled from a central point, for example, from the dashboard. Even though the various air regulating means may be adjusted individually, it is also advisable to provide central control means for closing all of the regulating means simultaneously or at least all of the openings leading from the channels in rim portions 2 to 5 and other parts of the car top toward the outside.

The particular shape of the rim portions 2 to 5 or of the hollow crossbeam 7 is not material to the present invention so long as the ventilating openings, for example, apertures 8, 8', 15, etc., can be placed within a bottom wall of the duct and thereby be protected from the elements. Thus, rim portions 2 to 5 have been shown in the different views as being of different substantially triangular cross sections. Crossbeam 7 may also be of a shape and cross section different from those shown in FIGURES 4 and 7, but preferably it should be rather shallow so as not to protrude materially to the inside of the car. Of course, if desired, several hollow crossbeams may also be provided or the entire car top may be hollow. The ventilation of the car top has the additional advantage of cooling the top, which is a very desirable feature in summer or in hot climates.

The various ventilating openings leading to and from the inside of the car are preferably directed in different directions, as indicated, for example, by arrows 10, 13, 13', 17 and 17'. Thus, by a proper adjustment of the various air regulating means for the ventilating openings the air currents may be directed to particular areas within the car, while other areas will be less ventilated. This also applies to the air outlets which may be regulated so as to avoid disagreeable drafts within the car. The air inlets and outlets may also be located either on the upper side of the car top in the form of scoops or on the lower side of the projecting rim 2 to 5.

The particular location of the air inlets and outlets may also be extensively varied, as it depends considerably upon the particular shape of the car. Although ordinarily the air inlets might be located at the front part of the car and face in the driving direction, while the outlets or vents would face toward the rear, better ventilating conditions may sometimes be attained if these locations are reversed.

No particular valves, baffles, flaps, or other control elements have been illustrated in the drawings, as they are well known to any person who is familiar with the art, and also because their particular design depends upon the shape and location and purpose of the particular openings or channels.

Having thus fully disclosed in my invention, what I claim is:

1. An automobile body defining a passenger space, comprising a pair of oppositely disposed side walls and front and rear walls, a substantially flat car top extending over said passenger space, said car top having a a hollow rim portion projecting outwardly from each of said walls, said hollow rim portion including a bottom wall extending beneath said car top outside of said walls and forming together with said car top an enclosed ventilating channel in said hollow rim portion, inlet ventilating openings in said bottom wall leading from the atmosphere to the interior of said channel, and outlet ventilating openings in said ventilating channel leading from the interior of said channel to the passenger space of said body for the ventilation of said passenger space by the passage of air through the flow channel formed by said inlet openings, said ventilating channel and said outlet openings.

2. An automobile as defined in claim 1, further including means for controlling the flow of air through at least some of said ventilating openings.

3. An automobile body defining a passenger space, comprising a pair of oppositely disposed side walls and front and rear walls, a substantially flat car top extending over said passenger space, said car top having a hollow annular rim portion projecting outwardly from each of said walls, said hollow rim portion including a bottom wall extending beneath said car top outside of said walls and forming together with said car top an enclosed ventilating channel in said hollow rim portion, inlet ventilating openings in said bottom wall feeding from the atmosphere to the interior of said channel, and outlet ventilating openings in said ventilating channel leading from said channel to the passenger space of said body for the ventilation of said passenger space by the passage of air through the flow channel formed by said inlet openings, said ventilating channel and said outlet openings, and at least one transverse channel in said car top connecting the channel portions above each of said side walls, said transverse channel also having outlet openings leading therefrom to the interior of said passenger space.

4. An automobile as defined in claim 3, wherein at least some of said ventilating openings include hollow means projecting outwardly from the exterior surfaces of said hollow rim portion and into the air stream passing along said surfaces, said hollow means communicating with the interior of said channel.

5. An automobile body defining a passenger space, comprising a pair of oppositely disposed side walls and front and rear walls, a substantially flat car top extending over said passenger space, said car top having a hollow rim portion projecting outwardly from each of said walls, said hollow rim portion including a bottom wall extending beneath said car top outside of said walls and forming together with said car top and said walls an enclosed ventilating channel in said hollow rim portion, inlet ventilating openings adjacent the front of said passenger space in said bottom wall leading from the outer atmosphere to the interior of said channel, outlet ventilating openings in said ventilating channel leading from said channel to the interior of said passenger space of said body for the passage of air through the flow channel formed by said inlet openings, said ventilating channel, and said outlet openings; second inlet ventilating openings adjacent the rear of said passenger space leading from said passenger space to the interior of said ventilating channel and second outlet ventilating openings in said bottom wall leading from the interior of said channel to the outer atmosphere for the passage of air from said passenger space through the flow channel formed by said second inlet openings, said ventilating channel, and said second outlet openings.

6. An automobile body defining a passenger space, comprising a pair of oppositely disposed side walls and front and rear walls, a substantially flat car top extending over said passenger space, said car top having a hollow annular rim portion projecting outwardly from each of said walls, said hollow rim portion including a bottom wall extending beneath said car top outside of said walls and forming together with said car top and said walls an enclosed ventilating channel in said hollow rim portion, inlet ventilating openings adjacent the front of said passenger space in said bottom wall leading from the outer atmosphere to the interior of said channel, outlet ventilating openings in said ventilating channel leading from said channel to the interior of said passenger space of said body for the passage of air through the flow channel formed by said inlet openings, said ventilating channel, and said outlet openings; second inlet ventilating openings adjacent the rear of said passenger space leading from said passenger space to the interior of said ventilating channel and second outlet ventilating openings in said bottom wall leading from the interior of said ventilating channel to the outer atmosphere for the passage of air from said passenger space through the flow channel formed by said second inlet openings, said ventilating channel, and second outlet openings, and at least one transverse channel in said car top connecting the portions of said ventilating channel above each of said side walls, said transverse channel including outlet ventilating openings leading from said channel to the interior of said passenger space.

References Cited in the file of this patent

UNITED STATES PATENTS

| | | |
|---|---|---|
| 1,635,609 | Crawford | July 12, 1927 |
| 1,958,056 | Lintern et al. | May 8, 1934 |
| 2,172,939 | Lintern et al | Sept. 12, 1939 |
| 2,202,703 | Lintern | May 28, 1940 |

FOREIGN PATENTS

| | | |
|---|---|---|
| 500,218 | Great Britain | Feb. 6, 1939 |